United States Patent [19]

Kaplan et al.

[11] 4,191,648

[45] Mar. 4, 1980

[54] FILTRATION DEVICE FOR FILTERING TEMPERATURE CONTROLLED FLUIDS

[76] Inventors: Stephen J. Kaplan, 4420 Cezanne Ave., Woodland Hills, Calif. 91364; Ladislaus S. Lengyel, 25623 Bellerise Dr., Valencia, Calif. 91355

[21] Appl. No.: 875,599

[22] Filed: Feb. 6, 1978

[51] Int. Cl.² ............ B01D 35/18; B01D 29/32
[52] U.S. Cl. .................... 210/186; 210/323 T; 210/340; 210/420; 425/199
[58] Field of Search ........... 210/180, 184, 186, 323 T, 210/340, 341, 420, 424; 425/197, 198, 199

[56] References Cited

U.S. PATENT DOCUMENTS

| 666,044 | 1/1901 | Barr | 210/323 T X |
|---|---|---|---|
| 2,218,715 | 10/1940 | MacCormack | 210/186 |
| 2,294,107 | 8/1942 | Beck | 210/184 X |
| 2,732,950 | 1/1956 | Keight et al. | 210/186 |
| 2,859,876 | 11/1958 | Brundage | 210/323 T |
| 3,727,767 | 4/1973 | Itter et al. | 210/341 X |
| 3,896,029 | 7/1975 | Beuselinck | 210/341 |
| 3,915,860 | 10/1975 | Priest | 210/180 X |

FOREIGN PATENT DOCUMENTS

| 482743 | 7/1953 | Italy | 210/184 |
|---|---|---|---|
| 111196 | 7/1944 | Sweden | 210/186 |

Primary Examiner—Robert H. Spitzer
Attorney, Agent, or Firm—Romney, Schaap, Golant, Disner & Ashen

[57] ABSTRACT

A filtration device for filtering of temperature controlled process liquids, as for example, liquid hot melts. The filtration device includes an outer housing with a sleeve disposed within and spaced from the side wall of the housing to form a temperature regulating fluid chamber therebetween. An elongate member with a groove or channel formed therein extends between the sleeve and the housing side wall. A filter assembly having an outer casing may be removably disposed within a filter chamber formed by the sleeve. In this case, the filter casing would have a fitting extending from the casing and through the elongate groove to a process liquid inlet pipe connected to the housing side wall. Releasable bolts operatively engage the filter casing to permit holding of the casing in the filter chamber. Another fitting extends from the casing and through the elongate groove to a process liquid outlet pipe connected to the housing side wall. This construction permits easy removal of the filter casing for cleaning of the filter assembly without physically disconnecting process liquid lines or temperature regulating fluid lines. This construction also permits fairly complete temperature regulating fluid flow around the filter assembly.

27 Claims, 9 Drawing Figures

FILTRATION DEVICE FOR FILTERING TEMPERATURE CONTROLLED FLUIDS

BACKGROUND OF THE INVENTION

1. Purpose of the Invention

This invention relates in general to certain new and useful improvements in filtering devices for filtering temperature regulated liquids, and, more particularly, to unique filtering devices and methods of use which permit filtering of high viscosity temperature regulated liquids and which permits close temperature regulation and which is also easily assembled and disassembled.

2. Brief Description of the Prior Art

In the processing of high viscosity, high temperature liquids, and especially thermoplastic and thermosetting polymer melts, it is necessary to pass the liquid plastic melt or other liquid material through filters. These plastic polymers contain many impurities which result in periodic clogging of the filters and therefore the necessary attendant cleaning of the filters. Accordingly, in the processing of these plastic liquid melts, whether monomeric or polymeric, two or more filters in parallel streams are often employed in a process such that one of the filters in one stream may be shut down for temporary cleaning with the other filter being operative in the other process stream. These filters must be effective for purposes of controlling hot thermoplastic or thermosetting liquid melts, particularly of high viscosity, as for example, 1000 poise, and greater.

The filters, as well as the valves and the fluid lines which carry the hot liquid plastic, must be heat sealed. Moreover, the valves and fluid lines must be provided with a means for regulating the temperature of the hot plastic melt during processing. Thus, for example, the various lines which carry the plastic melt may be jacketed for receiving a suitable temperature maintaing or so-called "heat regulating" fluid. In addition, it is necessary to provide filters which contain jackets for receiving a heat regulating liquid to thereby maintain the liquid hot melt at a desired temperature during the processing.

Many of the conventional filters typically employ a jacket disposed over only certain portions of a filter body and which jacket receives a heat regulating fluid typically designed to apply heat to the filter body and hence the plastic liquid melt passing through the filter. This arrangement has not proved to be too effective inasmuch as only certain of the outer portions of the filter body are heated.

U.S. Pat. No. 3,727,767 to Itter et al. proposes a combination filter and valve arrangement in which two parallel filter-valve arrangements are employed. However, one of the major problems with this form of arrangement is that it is quite difficult to shut off the flow to one of the filters while maintaining the flow to the other of the filters. In addition, each filter-valve arrangement is quite complex in its construction, thereby necessitating almost complete disassembly of the valve-filter arrangement in order to clean the filter portion thereof. Notwithstanding the above, it has been found that this form of valve-filter arrangement has not been very effective in maintaining the liquid plastic melt at a desired temperature during the filtering thereof.

In addition to the above, the devices of the type taught in the Itter et al. Patent do not disclose an effective means for providing a temperature controlling fluid to surround the filter while the filtering device is used to process the liquid melt. One of the primary problems in this regard is that most conventional filtering devices do not provide an adequate arrangement for introducing a temperature controlling fluid in order to maintain the liquid melt at a desired temperature during the processing thereof. The Itter et al. Patent is representative of the prior art in that it does not disclose any effective means for maintaining a temperature control fluid surrounding the entire filter valve assembly or at least a substantial portion thereof.

Another one of the primary disadvantages of the filter assemblies of the prior art is that these assemblies are rather complex in their construction and do not provide for easy removal of the filter casing from the filter pot, namely, that is, the housing surrounding the filter. In most of these devices, the filter is actually an integral part of, or otherwise rigidly secured into, a surrounding casing. Thus, the removal of the filter for purposes of cleaning constitutes a rather complex task, and almost always necessitates a complete disassembly of the filter, thereby requiring the complete cessation of processing the hot liquid melt in one side of the processing system.

There have been many proposed dual filter arrangements in addition to that described in the above-cited Itter et al. Patent. For example, in British Patent No. 1,168,063, removable filter pots are employed in the valve with stop cock or rotary slide valve arrangements. One of the principal problems in the aforesaid British Patent, as well as the other prior art valve arrangements, is that after fluid flow is stopped, there is a standing amount of liquid polymer melt contained within the system. This is highly undesirable inasmuch as the standing liquid melt tends to harden and thereby requires almost complete disassembly of the filter system in order to clean the same. Most of the prior art systems do not afford any effective means for removing the remaining liquid melt in the filtering system after it has been turned to the "off" position, thereby stopping the flow of liquid melt therethrough.

In the commercially available filtering devices used with hot liquid melts, the filter casing is designed so that it is capable of being disposed within and rigidly secured to the outer housing. The filter casing is usually either integral with the surrounding outer housing or otherwise rigidly secured thereto in a way that it is not easily or quickly removable therefrom. This construction not only prevents easy removal of the filter casing for purposes of cleaning and replacement of the filter elements, but also interferes with the processing of the hot liquid melt.

Another one of the problems of the prior art devices for use in filtering the hot liquid melts is that it is quite difficult to clean or replace the filter element in the casing after a period of use. Due to the nature of the material being filtered, it is necessary to frequently and periodically replace or clean the filter element. The filter element is usually rigidly affixed to either the filter casing if used or otherwise to the housing, and it is, therefore, difficult to remove the filter element without shutting off the entire system or stream at least for a substantial time period.

Another specific problem in the processing of hot liquid melts resides in the preheating of a filter or filter system used in conjunction with a process for filtering a hot liquid melt. It is generally desirable to preheat the vessel or casing containing the filter element so that is at the ambient temperature of the melt before the filter is introduced into the process stream. In conventional practice, the filter must be introduced in a standard preheating system, that is a system which is provided with a vessel surrounded by a heat regulating fluid in order to heat the filter element to a desired temperature. After the filter has been preheated to the desired temperature, the system in which the hot liquid melt flows is shut down for a short interval while the new filter is installed. This not only interrupts processing of the hot liquid melt, but oftentimes results in other undesirable process discontinuities and process interruptions.

OBJECTS OF THE INVENTION

It is, therefore, the primary object of the present invention to provide a unique filtering device for filtering contaminants from a high temperature liquid and which device is so constructed that easy and rapid assembly and disassembly is enabled for cleaning or replacement of a filter therein.

It is another object of the present invention to provide a filtering device of the type stated which can be partially disassembled, without complex disconnection of the fluid input lines and fluid output lines to said device.

It is a further object of the present invention to provide a filtering device of the type stated which is capable of having standing liquid melt drained therefrom during non-use conditions.

It is an additional object of the present invention to provide a filtering device of the type stated in which a liquid plastic melt passing through the filtering device can be heated substantially entirely on the exterior surface of a filter cannister disposed in the device by a heat regulating fluid.

It is also an object of the present invention to provide a filtering device of the type stated in which the device comprises a filter casing which can be easily disassembled for cleaning or replacing a filter element without requiring a considerable amount of manual attention and a long time period for disassembly.

It is another salient object of the present invention to provide a system which operates in conjunction with a pair of filters for filtering hot liquid plastic melts such that the filters on the two process streams of the system can be easily and quickly removed and cleaned or replaced in order to permit processed fluid flow between the various filters without disruption or discontinuity in the process stream.

It is yet an additional object of the present invention to provide a preheating device for preheating filters of the type which filters a liquid plastic melt and where the filters can be heated substantially on the exterior surface thereof by a heat regulating fluid.

It is also an object of the present invention to provide a method of easily disassembling a filter mechanism without requiring a considerable amount of manual attention or a long time period for disassembly.

It is still a further object of the present invention to provide a method of filtering a high viscosity, high temperature liquid in an environment in which the liquid passing through the filter is maintained at its process temperature.

With the above and other objects in view, our invention resides in the novel features of form, arrangement and combination of parts presently described and pointed out in the claims.

SUMMARY OF THE DISCLOSURE

The present invention relates in general to a filtration device, and, more specifically, to housings for conventional filter assemblies of the type used to filter contaminants from temperature controlled liquids. In a preferred aspect, the filtration device of the present invention is uniquely designed to filter contaminants from high viscosity high temperature liquids which are passed through the filter under high pressure. Nevertheless, the filtration devices of the present invention are also equally applicable to filtering other forms of liquids as hereinafter described in more detail.

Filtration devices of this type are typically used in systems where a high temperature high viscosity liquid, such as a hot polymer melt, may be diverted from one fluid path to another fluid path by means of valves, and in which each of the fluid paths contain an individual filter assembly. Thus, when one of the filter assemblies becomes clogged, or otherwise requires cleaning or repair, the process liquid flow is diverted from one process liquid path containing the filter assembly to the other process liquid path containing another filter assembly.

The filtration device of the present invention comprises an outer cylindrically shaped housing side wall forming an interior central bore. Located within the central bore of the housing side wall is a tubular cylindrically shaped sleeve also having a cylindrically shaped sleeve side wall with a diametral size less than the side wall of the housing in order to form a temperature regulating fluid chamber therebetween. The sleeve also is centrally bored in order to provide a filter receiving central chamber designed to receive the filter casing of a filter assembly.

A pair of vertically disposed spaced apart columns extend between the side wall of the sleeve and the side wall of the housing and are secured thereto. One of the vertically disposed columns has a section extending outwardly from the side wall of the housing. In addition, each of the vertically disposed columns is provided with an elongate groove on the interiorly presented surface. The elongate grooves are diametrally opposite each other.

The central filter receiving chamber is sized and shaped to accommodate a filter assembly or filter device having a filter casing with a cylindrically shaped side wall. Outwardly extending fittings are connected to end plates on opposite ends of the filter casing and connect to ducts passing through the end plates which lead into an interior process liquid chamber formed within the filter casing. In addition, the fittings extend into one of the grooves in one of the columns and respectively communicate with the inlet and outlet process fluid pipes connected to the side wall of the housing. In this way, the filter casing can be easily removed through an open upper end of the housing and inserted thereinto and in each case, the fittings on the filter casing will always be alignable with the inlet and outlet pipes.

At least one or more heat regulating fluid inlet lines is connected to the housing for introducing a heat regulating fluid into the heat regulating fluid chamber, and in like manner, one or more heat regulating fluid outlet lines is connected to the housing for withdrawing the fluid from this chamber. A bottom wall extends across the lower end of the sleeve and is dished-out in order to form a cavity to receive any excess process fluid. Moreover, a bottom cap is secured to the lower end of the outer housing side wall in order to form a lower end of the heat regulating fluid chamber. In this way, the heat regulating fluid can circulate substantially around the side wall of the sleeve and the bottom wall thereof. A heat conducting plate can be disposed upon the upper end of the housing over any filter casing or cannister disposed within the filter receiving chamber. In this way, the heat conducting plate can receive heat through the heat regulating fluid and transfer the same to the upper end of the filter casing.

The filter assembly of the present invention includes the filter casing along with the upper plate and lower plate as aforesaid. Moreover, filter tube bundles are located within the filter casing. The upper end plate forms part of a manifold which receives the process liquid after it has been filtered by the various tube bundle filters. The lower end plate forms a header which receives the process liquid prior to filtering thereof.

A plurality of bolts extend through the vertical column opposite the column which receives the fittings. These bolts engage bearing plugs which extend from the casing side wall essentially diametrally opposite the fittings. In this way, the casing can be supported in the filter receiving chamber. By releasing the bolts, the casing can be removed from the housing without separately disconnecting any process lines or temperature regulating fluid lines.

By virtue of this construction, it is possible to easily remove the filter casing by removing an upper end plate on the sleeve. In this way, the filter casing can be easily pulled out of the filter receiving chamber formed by the interior sleeve. Moreover, the device of the present invention can act as a preheating device so that a filter casing may be dropped into the filter receiving chamber and permitted to be preheated to a desired temperature before it is introduced into a process system.

Moreover, the filtration device of the present invention is unique in that it permits heating of the filter casing and the process fluid passing therethrough around substantially the greater portion of the exterior surface of the filter casing. Another one of the unique aspects of the present invention is that the filtration device can be formed from standard tubular pipe shapes and thereby permits relatively inexpensive fabrication.

Further advantages and objects of the invention will become apparent from the following detailed description.

BRIEF DESCRIPTION OF THE DRAWINGS

Having thus described our invention in general terms, reference will now be made to the accompanying drawings in which:

DETAILED DESCRIPTION OF A PREFERRED EMBODIMENT

Referring now in more detail and by reference characters to the drawings which illustrate a preferred embodiment of the present invention, A designates a filtration device which is primarily, although not exclusively, used for filtering of hot liquid melts, as for example, thermoplastic melts, thermosetting melts and the like. Generally, then melts and similar liquids must be temperature controlled during processing thereof. It should be understood, however, that while the present invention is designed to remove contaminants from high viscosity, high pressure and generally high temperature liquids, it can also be used for low viscosity and low pressure fluids, whether or not they are operable at high or low temperatures.

In many cases, such as in the filtering of monomers, the monomer has a relatively low viscosity, such as that equivalent to water or mineral oil, although the temperature may be maintained at a relatively high level. However, in the case of control of monomer flow, it is not necessary to use a high pressure fluid flow system.

This type of filtration device of the present invention is designed for effective filtering of high viscosity and high pressure and high temperature liquids such as hot thermoplastic and thermosetting liquid melts. As used herein, high viscosity polymers or liquids generally have a viscosity range of about 50 poise or lower to about 50,000 poise or higher. Low viscosity polymers or liquids generally have a viscosity in the range of water or mineral oils and generally from about one to about one hundred centipoise or higher. The high pressures used for such liquids generally ranges from about 500 psi or lower to about 5,000 psi and higher, and low pressures for low pressure liquids would be about 50 psi or even less, to about 1000 psi. The term high temperature for such liquids as used herein generally means temperature ranges from about 400° F. or lower to about 650° F. or higher. Low temperatures for such liquids as used herein generally means temperature ranges of about 200° F. or lower to about 600° F. or higher.

It is also possible to filter liquids other than polymers and monomers, as for example coatings, adhesives, emulsions and the like. Generally, these liquids have a viscosity in the range of about 1 centipoise or lower to about 100 centipoise or higher with a pressure of about 20 psi or lower to about 150 psi or higher. These other liquids are normally processed at a temperature in the range of about 70° F. to about 300° F.

Figure 1:
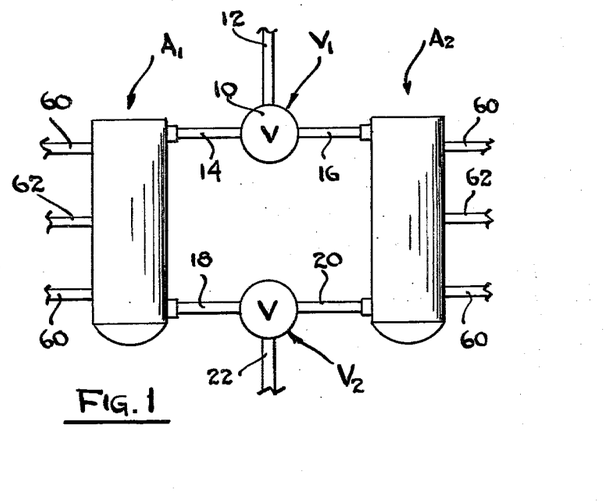
FIG. 1 is a schematic view showing a pair of filtration devices of the present invention used in a filter process system for hot liquid melts.

FIG. 1 illustrates a schematic arrangement in which two filters A of the present invention are used in conjunction with two valves such that fluid flow can be diverted from one process stream passing through one of the filters into a second process stream passing through the other of the filters. This form of process system employs a pair of conventional valves and in which two filtration devices of the present invention are employed. In this case, the system comprises a first valve V₁ and a second valve V₂ which are operated in conjunction with the filters designated as A₁ and A₂.

The valves V₁ and V₂ are generally of conventional construction and include an outer housing 10 having a valve mechanism (not shown) included therein. The filtration devices A in this case are designed to filter temperature controlled process fluids and usually high viscosity fluids, such as hot thermoplastic liquid melts. The valve V₁ is provided with a fluid inlet pipe 12 carrying a hot liquid thermoplastic melt and which is diverted in the valve into two fluid streams in outlet pipes 14 and 16, one of which is directed as an inlet to the filter A₁ and the other of which is directed as an inlet to the filter A₂. The hot thermoplastic liquid melt which passes through the filters A₁ and A₂ has the contaminants removed therefrom and is then introduced into outlet pipes 18 and 20 which are, in turn, respectively connected to inlets to the valve V₂ and the latter is again provided with a discharge pipe 22. In this respect, it can be observed that the pipes 12, 14, 16, 18, 20 and 22 could all be provided with conventional heat insulation, and preferably jackets disposed therearound, for receiving a heating fluid to circulate around the various pipes.

The valves V₁ and V₂ operate in conjunction with each other and in a time-related manner in order to proportionately divert fluid flow between the filters A₁ and A₂. Thus, while fluid flow is increased through the outlet pipe 16 and decreased through the outlet pipe 14, the valve V₂ controls the inlet of fluid flow through the pipes 18 and 20. In this way, the amount of hot liquid thermoplastic melt introduced through the inlet pipe 12 is proportional to the amount passing through the discharge pipe 22. In this way, the process fluid could be diverted through filter A₂ in order to clean or repair the filter A₁.

The filtration device A generally comprises an outer housing 30 having a cylindrically shaped side wall 32. By reference to FIG. 6, it can be observed that the side wall 32 is actually formed by a pair of opposed semi-cylindrical side wall sections 34 and 36. A pair of vertically disposed diametrally opposite bars or columns 38 and 40 form part of the outer housing 30. It can be observed that the vertically disposed bar 40 has a greater thickness than the bar 38 in the radial dimension, reference being made to FIG. 6 of the drawings. Moreover, it can be observed that the vertically disposed bars 38 and 40 do not extend for the full axial length of the cylindrical side wall 32.

In the embodiment as illustrated, the terminal edges of the semi-cylindrically shaped side wall sections 34 and 36 abut against the flat walls of the vertically disposed columns 38 and 40 and in this case are welded thereto. However, it should be understood that the side wall sections 34 and 36 could extend around at least the vertically disposed column 38 and welded to the outwardly presented flat wall 42 of the column 38.

Figure 3:
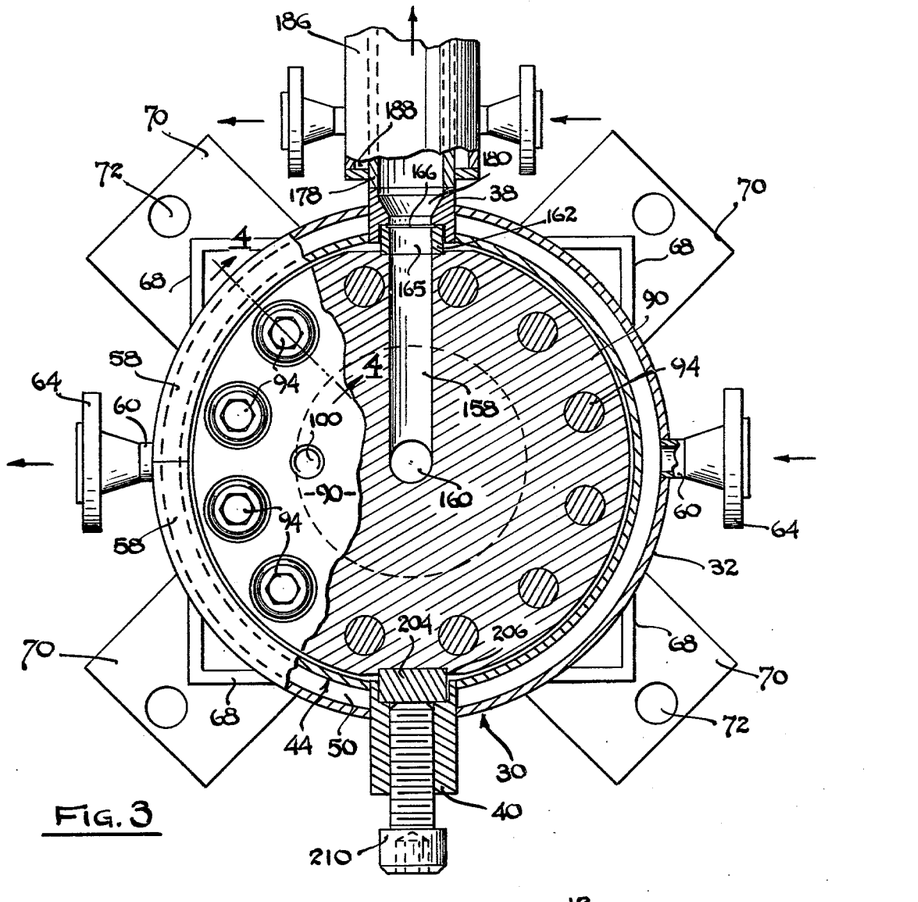
FIG. 3 is a horizontal sectional view taken along line 3—3 of FIG. 2.
Figures 6, 7:
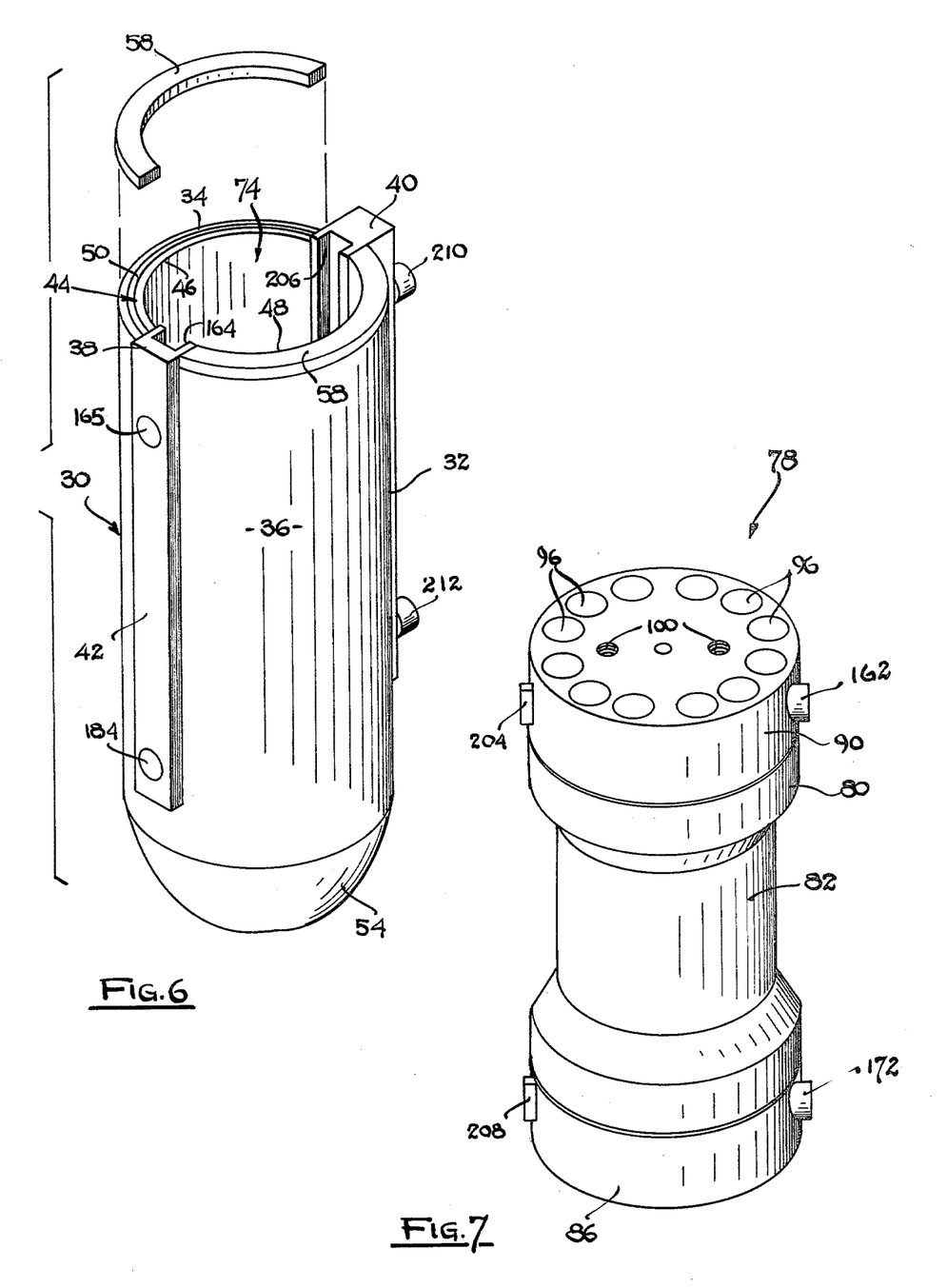
FIG. 6 is an exploded perspective view, partially broken away, and showing a portion of the filtration device of the present invention.
FIG. 7 is a perspective view showing a typical filter casing containing filter tube bundles which fits within the housing of the present invention.

Located within the cylindrical outer housing 30 is a cylindrically shaped sleeve 44 which is comprised of semi-cylindrical sleeve sections 46 and 48. Here, again, the semi-cylindrical side wall sections 46 and 48 are welded to the opposite flat walls of the vertically disposed columns 38 and 40 in the manner as illustrated in FIGS. 3 and 6 of the drawings.

The sleeve 44 has a peripheral size, namely, a diameter which is less than that of the interior surface of the housing side wall 32. In this way, a temperature regulating fluid chamber 50 is formed between the sleeve 44 and the housing side wall 32, and which is designed to receive a temperature regulating fluid, as hereinafter described.

Figure 5:
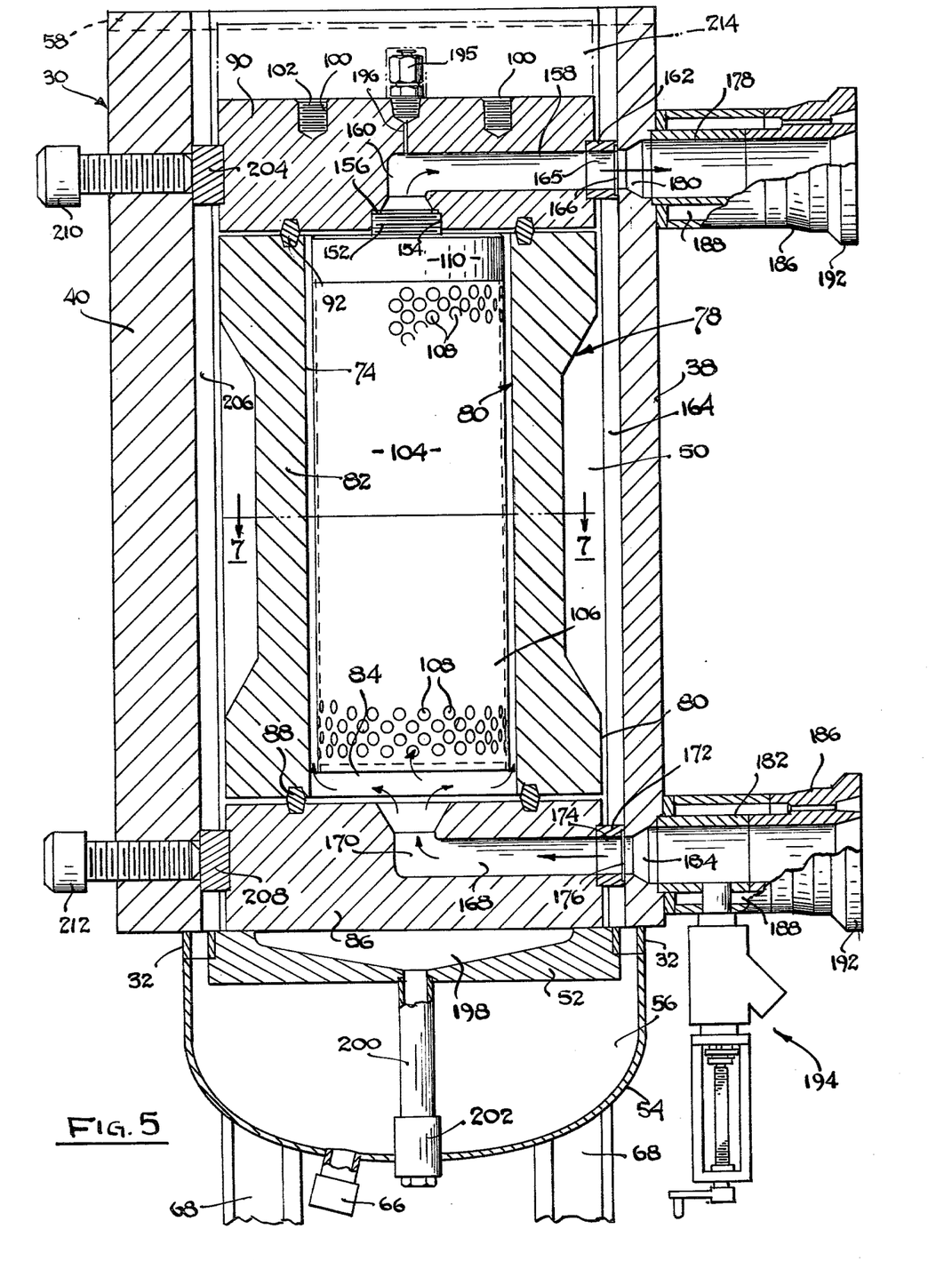
FIG. 5 is a vertical sectional view taken along line 5—5 of FIG. 2.

A lower plate 52 is welded or otherwise rigidly secured to the lower end of the sleeve 44, in the manner as illustrated in FIG. 5 of the drawings, and thereby encloses the lower end of the sleeve to prevent the temperature regulating fluid chamber 50 from communicating with the interior of the sleeve 44. The plate 52 is welded or otherwise secured to the lower end of the sleeve 44 in such manner that a liquid-tight seal is formed therebetween. Moreover, an end cap 54 is welded or otherwise rigidly secured to the lower end of the outer housing side wall 32 in sealingwise engagement therewith in order to form a lower portion 56 of the temperature regulating fluid chamber 50.

In order to completely enclose the temperature regulating fluid chamber 50, a semi-cylindrically shaped upper end cap 58 is welded to the upper edges of the cylindrically shaped side wall section 34 and the sleeve section 46 and another semi-cylindrically shaped upper end cap 58 is welded to the upper end of the cylindrically shaped side wall section 36 and the sleeve section 48. In this way, the temperature regulating fluid chamber 50 is fully enclosed.

The temperature regulating fluid chamber 50 is designed to receive a temperature regulating fluid of the type which maintains a process liquid at a desired temperature during the filtering process. For this purpose, the housing 30 is provided with a first pair of temperature regulating fluid inlet pipes 60 and a first temperature regulating fluid outlet pipe 62 extending through the side wall section 34 and being located approximately midway between the vertically disposed columns 38 and 40. In like manner, a second pair of temperature regulating fluid inlet pipes 60 and a second fluid outlet pipe 62 extends through the opposite side wall section 36, again, approximately midway between the vertically disposed columns 38 and 40. In this way, temperature regulating fluid can be introduced and removed from the temperature regulating fluid chamber 50. Moreover, the inlet pipes 60 and the outlet pipes 62 are suitably provided with conventional mounting flanges 64.

Due to the fact that the vertical columns 38 and 40 extend throughout a portion of the temperature regulating fluid chamber 50, circulation generally occurs only through the lower portion thereof, namely, the portion of the fluid chamber 56 formed by the end cap 54. Accordingly, in many cases, it is desirable to include a plurality of fluid inlet lines and an outlet line on each side of the housing.

For purposes of draining the temperature regulating fluid, a conventional drain plug 66 is secured to the end cap 54 and communicates with the temperature regulating chamber section 56, in the manner as illustrated in FIG. 5 of the drawings. Provision for draining the temperature regulating fluid is desirable when it is desired to disassemble and clean the filtration device A.

The temperature regulating fluid could be any form of fluid capable of providing a desired temperature to the high viscosity, high temperature process liquid passing through the filtration device. In essence, this temperature regulating fluid is designed to maintain the same temperature of the high viscosity, high temperature process liquid such as the thermoplastic liquid melt. A number of commercially available fluids are available for this purpose including one fluid marketed under the trademark "Dowtherm".

The heat regulating fluid is introduced into the chamber 50 at about 150 psi. On the other hand, the liquid thermoplastic melt or other form of liquid polymer is introduced into the valve device at a system pressure of about 3,000 psi in most situations. It has been found in connection with the present invention that the filter is capable of filtering a process liquid flow when the liquid has a viscosity of up to 30,000 poise and even higher. Generally, the temperature of the process liquid must be maintained at a system temperature of about 600° F. for polymer melts, although this temperature may vary depending on the type of process liquid being filtered.

A plurality of angled steel support legs 68 (four as shown) are welded to or otherwise rigidly secured to the outer housing 30 and extend downwardly therefrom. Secured to the lower ends of each of the support legs 68 are foot pads 70 which may be provided with bolt receiving apertures 72 for securement to the floor or similar supporting surface. However, it should be understood that other forms of support means could be provided.

The sleeve 44 is centrally bored in order to provide a filter device receiving chamber 74 and which may be sized to receive a conventional filter assembly usually comprised of an outer cannister or casing with a filtering means located within the filter cannister or casing. One of the preferred forms of filter assemblies for use with the housing of the present invention is the so-called "tube bundle" filter device. Thus, a filter assembly or filter device 78 which may be used in connection with the housing of the present invention is more fully illustrated in FIGS. 5, 7 and 8 of the drawings.

The filter assembly 78 comprises a filter casing or filter cannister including an outer cylindrically shaped housing 80. By reference to FIGS. 5 and 6 of the drawings, it can be observed that the housing is constructed of relatively thick metal components since it receives a process liquid under high pressure, and therefore is often referred to as a "pressure vessel". The housing 80 has a diametral size at least slightly less than the diametral size of the filter device receiving chamber 74 to be removably disposed therewithin. For purposes of weight reduction, the side wall 80 which is formed of a fairly substantial wall thickness may have a section 82 of reduced thickness, in the manner as illustrated in FIG. 7 of the drawings.

As indicated previously, the side wall 80 of the casing 78 is formed of a fairly substantial thickness due to the fact that the process liquid which passes through the filter casing 78 is under a very substantial amount of pressure. The filter casing 78 is also internally bored in order to form a process liquid receiving chamber 84.

A bottom plate 86 is secured to and extends across the lower end of the casing side wall 80. A plurality of bolts (not shown in FIG. 5) extend through the bottom plate 86 and into the casing side wall 80. The bolts are circumferentially spaced around the bottom plate 86 in alignment with the casing side wall 80.

The bottom plate 86 is sealed with respect to the lower end of the side wall 80 around the internal filter receiving chamber 74 with an annular seal 88, the latter of which is preferably a steel ring joint gasket. The gasket in the embodiment as illustrated in FIG. 5 of the drawings is preferably hexagonal in shape. However, any other metallic or other equivalent nonmetallic form of gasket could be used. In addition, it should be observed that while the gasket is preferably hexagonal in shape, other shaped gaskets could be employed.

Disposed over the upper end of the casing side wall 80 is a top casing plate 90 which extends across and is secured to the initially open upper end of the side wall 80. Again, the top plate 90 is sealed around the interior filter receiving chamber 74 by means of an annular seal 92. In like manner, the seal 92 may be formed of the same materials as the lower seal 88 and may also adopt any of the shapes as the seal 88 as previously described. In any event, it can be observed that the top plate 90, along with the bottom plate 86, provide the completely enclosed internal process liquid receiving chamber 84.

Figure 4:
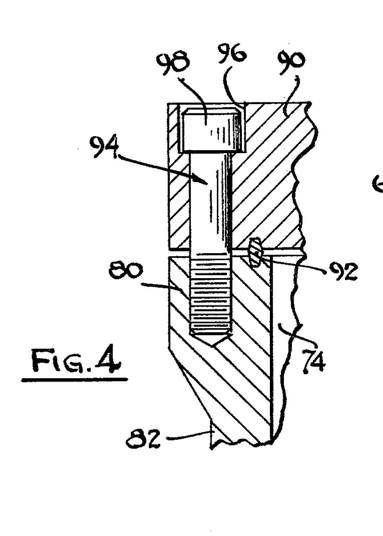
FIG. 4 is a fragmentary vertical sectional view taken along line 4—4 of FIG. 3.

The top plate 90 is secured to the side wall 80 of the filter casing 78 by means of a plurality of bolts 94. By reference to FIG. 4, it can be observed that the bolts 94 extend through the top wall 80 and into the relatively thick side wall 80. Moreover, it can be observed that the top plate 90 is provided with a plurality of countersinks 96 to receive the enlarged heads 98 of the bolts. It should be understood that the bottom plate 86 would be secured to the side wall 80 of the casing 78 through a bolt arrangement similar to that described for the top plate 90 and as illustrated in FIG. 4.

By virtue of this construction, it can be observed that the filter casing 78 can be easily disassembled when removed from the housing. Thus after the filter casing is removed, it is only necessary to remove the plurality of bolts 94 in order to remove the filter contained therein, in a manner described in more detail hereinafter.

The top plate 90 is provided in its upper surface with a pair of circumferentially spaced recesses 100 which have internally threaded surfaces 102 to receive lifting hooks. In order to remove the casing, lifting hooks would be threadedly inserted into the recesses 100 and would be engaged by a suitable lifting device in order to remove the filter casing 78 from the upper end of the housing 30.

Figure 8:
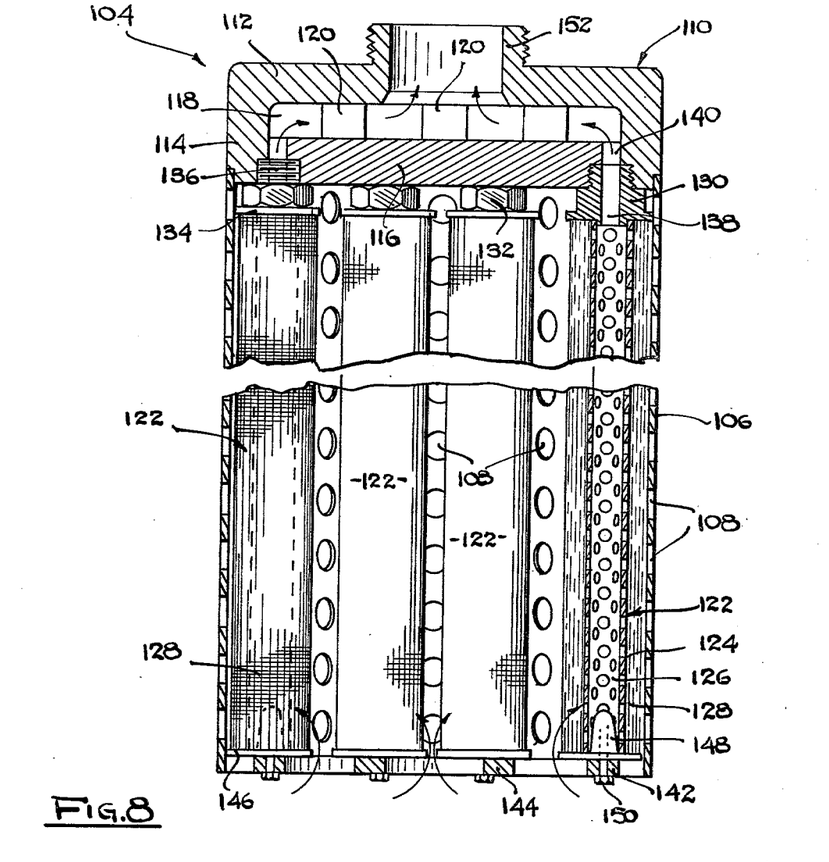
FIG. 8 is a vertical sectional view, partially in elevation, and showing one form of filter which is used in the filtration device of the present invention.
Figure 9:
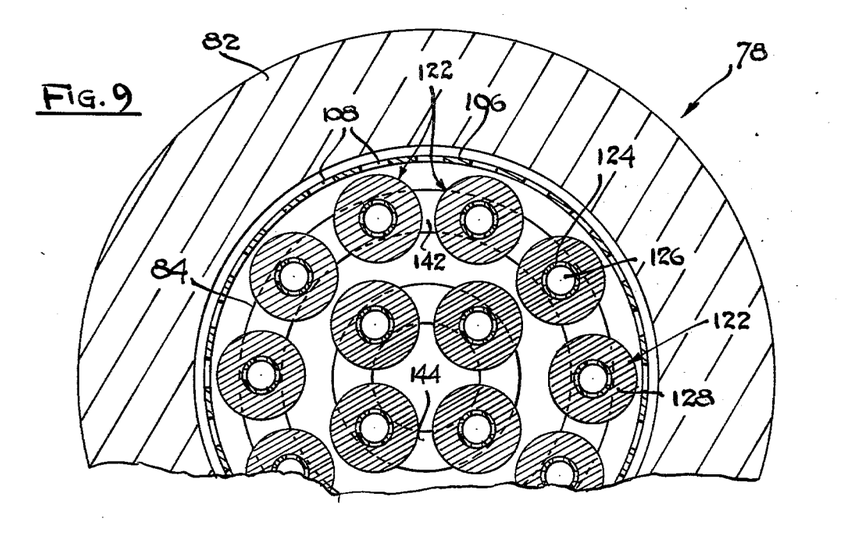
FIG. 9 is a fragmentary horizontal sectional view taken along line 9—9 of FIG. 5.

Disposed within the filter casing 78 is a filter cartridge 104 which is more fully illustrated in FIGS. 8 and 9 of the drawings. As indicated previously, any form of filter could be used in the filter casing 78. Preferably, any form of conventional tube bundle filter may be employed. In this respect, the filter cartridge 104 of the present invention is conventional in its construction, but is uniquely designed for use with the filtration apparatus A of the present invention.

The filter cartridge 104 comprises a cylindrically shaped perforated side wall 106 having a plurality of apertures 108 formed therein for process liquid to pass through the side wall 106. At its upper end, the filter cartridge 104 is provided with a head assembly 110 comprised of a top plate 112 having an integrally formed downwardly struck annular flange 114. Secured to the lower end of the annular flange 114 is a manifold plate 116 which is spaced from the top wall 112 to form a manifold chamber 118 therebetween. A plurality of upstanding posts 120 extend between the top wall 112 and the manifold plate 116 in order to maintain the spatial relationship therebetween.

Located within the perforated side wall 106 are a plurality of tube filters 122, and each of which is comprised of an inner perforated shield 124 forming a central passage 126 for receiving filtered process liquid. The exterior surface of the shield 124 is surrounded by a conventional filter element 128 which, in this case, may be a honeycomb plate structure. Any conventional type of filtering material, such as a gauze or the like, could be employed.

At its upper end, each of the interior perforated shields 124 are connected to an upper fitting 130, each being comprised of a hexagonal nut 132 having a base plate 134 for securement of the upper end of the perforated shield 124. Each fitting 130 is provided with an externally threaded hub 136 for threaded securement into an internally threaded receiving aperture formed between the bottom plate 116 and the flange 114, in the manner as illustrated in FIG. 8. Moreover, it can be observed that each of the fittings 130 are provided with a central aperture 138 communicating with an individual liquid passage 140 and which, in turn, is in communication with the manifold chamber 118.

Each of the filter tubes are similar in construction and, thus, each filter tube will receive the process liquid, either at the lower end thereof or somewhere along the length of the side wall and filter the process liquid as it passes through and into the central chamber 126 of the internal shield 124. The process liquid will then pass through the fitting 130 and through the opening 140 into the manifold chamber 118.

In the embodiment as illustrated, fourteen such filter tubes have been illustrated, although it should be observed that the number of filter tubes empolyed could vary depending upon the type of process fluid being filtered and on other conditions, including the size of the filter cannister. As indicated previously, any conventional material may be employed. In the embodiment described herein, the filtering material is preferably of the type used for filtering the process liquids which are the high temperature, high viscosity and high pressure melts. Nevertheless, the type of filter element which is employed will depend upon the type of process liquid being filtered. Thus, in the case of a low viscosity process liquid, different forms of filters may be employed.

By reference to FIG. 9, it can be observed that a ring of outer filter tubes and a ring of inner filter tubes are formed when located within the filter cartridge in the arrangement as illustrated and described. In this case, each of the rings of filter tubes are connected at their lower ends by circular connecting rings 142 and 144. Each filter tube is provided at its lower end with a bottom plate 146 and having an enlarged boss 148 formed therein and projecting into the chamber 126 of the internal perforated shield 124. In this way, bolts 150 may extend through the rings 142 or 144 and through the bottom plate 146 and into the boss 148 for threaded securement thereto.

The top part of the cartridge is provided with an upstanding externally threaded boss 152 which is threadedly secured into a recess 154 formed in the bottom face of the top plate 90, in the manner as illustrated in FIGS. 5 and 8 of the drawings. Moreover, the boss 152 is tubular and communicates with the manifold chamber 118. An aluminum seal washer 156 is disposed around the upper end of the boss 152 when threaded into the recess 154 in order to provide sealing contact and thereby prevent leakage of a discharged process liquid. In this respect, it can be observed that the process liquid enters into the process liquid receiving chamber 84 through the lower end thereof and is passed through the manifold chamber 118 and out through the boss 152.

A horizontally disposed duct 158 is formed within the top plate 90, in the manner as illustrated in FIG. 5, and has a section 160 communicating with the recess 154. Extending radially outwardly from the top plate 90 is a cylindrical fitting or pipe section 162 which fits within an elongate groove 164 formed within the column 38. Moreover, it can be observed that the fitting or pipe section 162 has an interior bore 165 in alignment with the duct 158.

The bottom plate 86 is also provided with a duct 168 having a section 170 which extends into and communicates with the process liquid chamber 84, in the manner as illustrated in FIG. 5. At its outer end, the bottom plate 86 is also provided with a tubular fitting or pipe section 172 having a central bore 174 in alignment with the duct 168. At its outer end, the fitting 172 is similarly provided with a seal 176. Again, by reference to FIGS. 5 and 6 of the drawings, it can be observed that the two fittings 162 and 172 would be located within the elongate groove 164 when the filter casing 78 is dropped into the filter chamber 74.

By further reference to FIG. 5 of the drawings, it can be observed that the column 38 is provided with an outwardly extending process liquid outlet pipe 178 and which communicates with an aperture 180 formed within the side wall 32. The aperture 180 is in alignment with the central bore 165 of the fitting 162. In like manner, the column 38 is provided with an outwardly extending process liquid inlet pipe 182 which also extends into the column 38 and which also communicates with an aperture 184 extending through the column 38. Again, the aperture 184 is in alignment with the central bore 174 of the fitting 172.

The pipes 178 and 182 extend only partially through the column 38 and open into the apertures 180 and 184, respectively. However, it should be understood that this is only for convenience of construction and that the pipes 178 and 182 could extend completely through the column 38. However, the use of these apertures 180 and 184, as opposed to pipes extending entirely through the side wall, enables a slight reduction in the size of the apertures which is desirable for better communication between the pipes 178 and 182 and the fittings 162 and 172, respectively. The seals 166 and 176 are slightly larger than the apertures 180 and 184 so that some misalignment can occur. Nevertheless, when the fittings 162 and 172 are aligned with the apertures 180 and 184, a close fluid sealing contact with be achieved.

The outlet pipe 178 and the inlet pipe 182 are each provided with jackets 186 forming a temperature regulating fluid chamber 188 around each of the outlet pipe 178 and the inlet pipe 182. Moreover, the assembly, including the inlet and outlet pipes and the jackets 186, are provided with a mounting flange plate 192 for securement to a process liquid inlet line and a process liquid outlet line.

The inlet pipe 182 may be provided with a conventional drain valve 194, as for example, a ram seal process drain valve. In this way, it is possible to drain any process liquid which may remain in the inlet line 182 when the filtration device is disassembled for purposes of cleaning or repair. In like manner, the process fluid outlet pipe 178 could similarly be provided with a drain valve if desired.

The top plate 90 is also provided with a conventional bleed valve 195 and which communicates with the process liquid outlet duct 158 by means of a relatively small diameter passage 196. In this way, it is possible to bleed-off some of the process liquid which is passing through the filter cannister 78 and the discharge duct 158.

The upper surface of the bottom plate 52 is dished-out in order to form a liquid melt collecting chamber 198, in the manner as illustrated in FIG. 5. A drain pipe 200 communicates with the collecting chamber 198 and extends downwardly and outwardly through the end cap 54. At its lower end the drain pipe 200 is provided with a fitting 202 which may be in the form of a conventional valve in order to open and close the drain pipe 200. Alternatively, a conventional valve, as for example, a spool valve or stopcock or the like, could be located in a downstream portion of the drain pipe 200. The drain pipe 200 is provided for drainage of any excess process liquid which may have overflowed into the process liquid collecting chamber 198 during removal of the filter casing 78.

By further reference to FIG. 5, it can be observed that the top plate 90 is provided with a cylindrically shaped bearing plug 204. Moreover, the bearing plug is in approximate diametral alignment with the fitting 162 in the manner as illustrated in FIG. 3 of the drawings. In addition, the bearing plug 204 fits within an elongate U-shaped groove or channel 206 formed within the vertically disposed column 40. In like manner, the bottom plate 86 is similarly provided with a similar bearing plug 208 extending from the side wall of the bottom plate 86 and being diametrally opposed to the fitting 172. Again, the bearing plug 208 is located within the vertically disposed channel 206. An upper bolt 210 extends through the housing side wall 32 and engages the bearing plug 204 in order to retentively hold the filter casing 78 within the sleeve 44. In addition, a similar bolt 212 extends through the housing side wall 32 and engages the bearing plug 208 in order to retentively hold the filter casing 78 within the sleeve 44. It can be observed that the bearing plugs 204 and 208 extend slighly within the respective upper plate 90 and the bottom plate 96.

In accordance with the above-outlined construction, it can be observed that a filter casing containing the conventional filter therein may be removably disposed within the filter receiving chamber 74. The filter casing is merely introduced into the chamber 74 through the open upper end of the housing with the fittings 162 and 172 in alignment with the channel 164. Moreover, the bearing plugs 204 and 208 would be located in alignment with and slipped into the channel 206. After the filter casing has reached its lowermost position, it may rest upon the bottom plate 52, in the manner as illustrated in FIG. 5. Thereafter, the locking bolts 210 and 212 are tightened. As the bolts 210 and 212 are so tightened, they will bear against the bearing plugs 204 and 208 and thereby retentively lock the filter casing within its position in the housing 30. As this occurs, the fittings 162 and 172 will be in alignment with the inlet pipes 178 and 182.

Due to the fact that the seals 166 and 176 are oversized, there can be a slight amount of variation in the alignment and thus critical tolerance is not required. In order to remove the filter casing 78 with the filter contained therein, it is only required to release the locking bolts 210 and 212 from their respective engagement with the bearing plugs 204 and 208. As this occurs, the fittings 162 and 172 will be released from engagement with the interior surface of the channel 164. Thus, with simple lifting hooks inserted into the lifting hook recesses 100, it is possible to left the filter casing 78 out of the housing 30.

In this respect, it can be observed that the housing of the present invention uniquely serves as a preheating device inasmuch as the temperature controlling fluid can circulate throughout the temperature controlling fluid chamber 50 without breaking any of the temperature controlling fluid lines. This is an important factor in that many of the temperature controlling fluids are not only toxic, but may present an explosion hazard when the temperature controlling fluid lines are broken. Thus, in order to serve as a preheating device, it is only necessary to drop a conventional filter within the filter receiving chamber 74 for purposes of preheating the same to a desired process temperature. Thereafter, the filter can be removed and inserted in a suitable filter housing within a filter process line.

The present invention is also unique in that a filter casing 78 can be removed by only momentarily shutting off the system and introducing a new filter casing 78 for purposes of continuing the filtration process. Otherwise, the flow can be diverted to an alternate filter in the manner as illustrated in FIG. 1 and as described below, in order to disassemble one of the filters in the system.

It can also be observed that the filter device 78 can be easily disassembled by removing the bolts 94 which extend through the upper and lower plates 86. In this way, the individual filters 122 may be removed for purposes of cleaning or repair. In addition, the filter device may be easily cleaned through the easy disassembly thereof.

Another one of the unique aspects of the present invention is that the housing can be fabricated in a relatively inexpensive manner. It can be observed that the housing sections 34 and 36 can be formed of standard tubular structural shapes. In like manner, the sleeve sections 46 and 48 can also be formed of standard tubular structural shape. Moreover, it can also be observed that the filter casing itself could be formed of a standard preformed tubular shape. In this case, the portion of the side wall would be milled away in order to form the reduced section 82. Thus, it can be observed that it is not necessary to engage in expensive machining operations in order to form the major components of the filtration device A of the present invention.

Another one of the unique aspects of the present invention is that a fairly substantial temperature controlling fluid flow exists around the filter casing during the filtration operation. It can be observed that the temperature controlling fluid will flow through the temperature controlling fluid chamber 50 and is only interrupted along the sides thereof as a result of the vertically disposed columns 38 and 40. However, due to the fact that the inlet and outlet temperature controlling fluid pipes are located on both sides of the housing 30, temperature regulating fluid flow is achieved. If desired, a heat conductive plate or so-called "heat-sink" plate 214 can be disposed on the upper end of the top plate 90. In this way, the heat will be conducted from the temperature regulating fluid in the chamber 50 through the top plate 90 and into the heat sink plate 214. Thus, complete temperature control is maintained substantially around the entire surface of the sleeve 44 and hence on the entire surface of the filter casing 78.

The various components forming part of the valve V of the filtration device of the present invention are preferably formed of a structural metal such as steel, stainless steel, or the like. However, the filter medium or filter element would be preferably formed of a suitable filtering material. The employment of an aluminum intermediate plate is desirable for purposes of fabrication and since it lends to better sealing with the upper and lower steel plates. However, it should be understood that other materials of construction could be used in the formation of the filtration device A.

Figure 2:
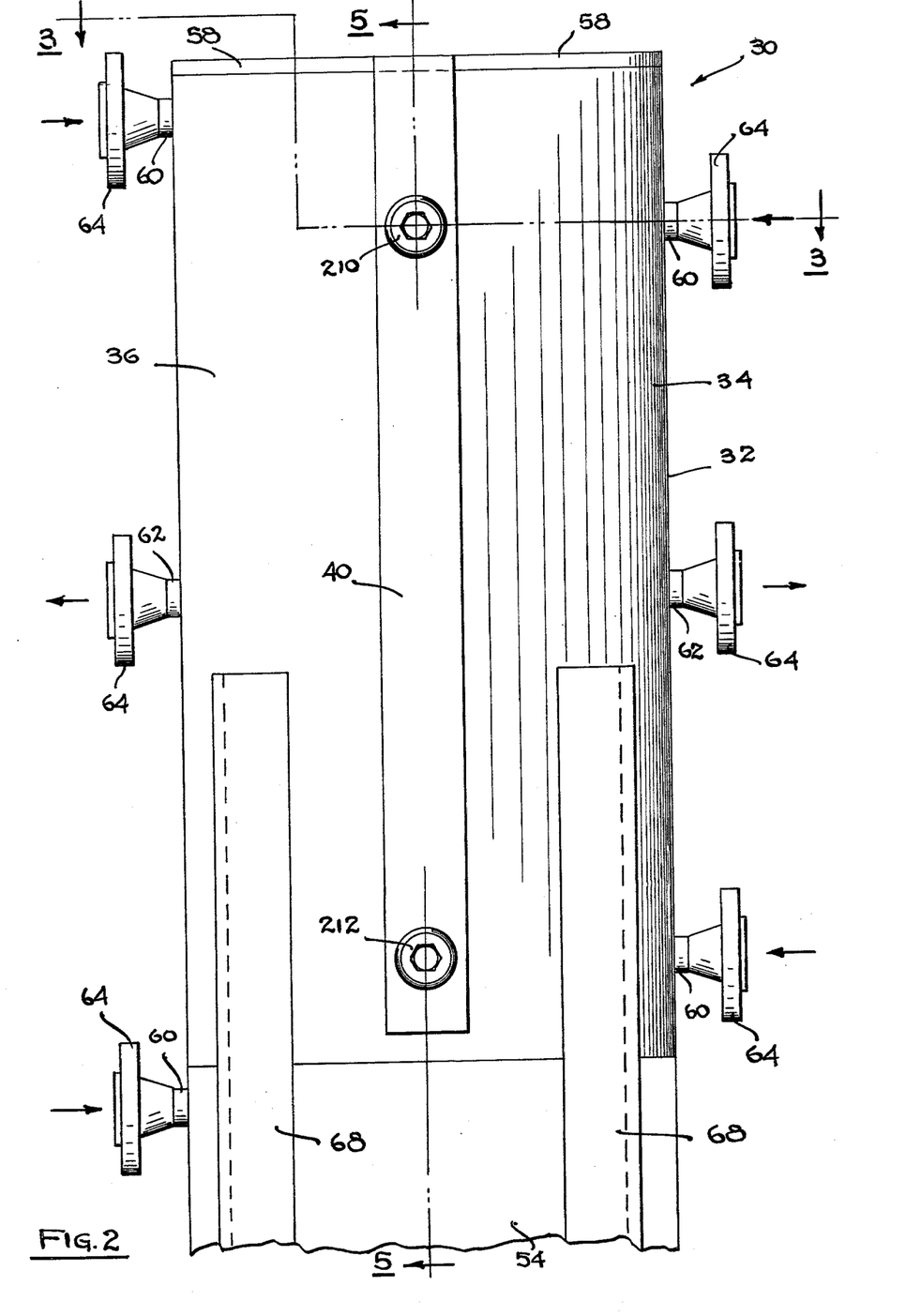
FIG. 2 is a side elevational view of one of the filtration devices of the present invention.

The filtration device A in FIG. 2 and the corresponding figures is illustrated in a vertically disposed position and reference is made to the components thereof when the filtration device is in the upright or vertically disposed position. However, it should be understood that the filtration device could be located in any orientation. Thus, in one aspect, the filtration device A of FIG. 2 could be located in a position where the central axis of the housing 30 would be in a relatively horizontal plane.

Thus, there has been illustrated and described a unique filtration device and a system in which the device may be used and which meets all of the objects and advantages sought therefor. It should be understood that many changes, modifications, variations and other uses and applications will become apparent to those skilled in the art after considering this specification and the accompanying drawings. Therefore, any and all such changes, modifications, variations and other uses and applications are deemed to be covered by the invention which is limited only by the following claims.

Having thus described our invention, what we desire to claim and secure by Letters Patent is:

1. A filtration apparatus for filtering contaminants from a temperature controlled process fluid, said apparatus comprising:
   (a) an outer housing,
   (b) a wall having a size smaller than said housing located within said housing and being spaced therefrom to form a temperature controlling fluid chamber surrounding at least a portion of said wall,
   (c) a filter canister disposed within said housing and being removable therefrom, said canister having a central process fluid receiving chamber and a filtering element therein for removing contaminants from a temperature controlled process fluid delivered to said process fluid receiving chamber,
   (d) a process fluid inlet on said canister for receiving the process fluid and delivering the process fluid to said filtering element,
   (e) a process fluid outlet on said canister for delivering a filtered process fluid from said canister,
   (f) means operatively associated with said housing for delivering a temperature controlling fluid to said temperature controlling fluid chamber to surround at least a portion of said canister and provide heat to the temperature controlled process fluid passing through said canister,
   (g) means operatively associated with said housing to remove said temperature controlling fluid from the surrounding relationship around at least said portion of said canister,
   (h) first process fluid transfer means operatively connected through said housing and alignable with the inlet on said canister to introduce process fluid into said process fluid receiving chamber, said first process fluid transfer means comprising a process fluid inlet pipe delivering process fluid at least to said housing,
   (i) a first temperature controlling fluid jacket surrounding said inlet pipe to maintain a flow of temperature controlling fluid around said inlet pipe at least to said housing,
   (j) second process fluid transfer means operatively connected through said housing and alignable with the outlet on said canister to remove process fluid from said process fluid receiving chamber, said second process fluid transfer means comprising a process fluid outlet pipe for removing process fluid from said housing and extending to and at least partially into said housing,
   (k) a second temperature controlling fluid jacket surrounding said outlet pipe to maintain a flow of temperature controlling fluid around said outlet pipe and extending into said housing,
   (l) means forming an opening in said housing for inserting and removing said canister from said housing, and
   (m) alignment means cooperating between said housing and said canister to permit alignment of said inlet and first transfer means and outlet and second transfer means when said canister is located within said housing, in only a certain orientation such that said canister can be inserted into said housing permitting the process fluid inlet to be in fluid communication with the first process fluid transfer means without coupling of any mechanical connection and said process fluid outlet to be in fluid communication with the second process fluid transfer means without coupling of any mechanical connection, said cannister also being removable from said housing without uncoupling any mechanical connection between said process fluid inlet and said first process fluid transfer means and between said process fluid outlet and said second process fluid transfer means.

2. The filtration apparatus of claim 1 further characterized in that said process fluid inlet comprises a fluid inlet fitting, said process fluid outlet comprises a fluid outlet fitting, said fittings operatively extending between said wall and said inlet and outlet pipes respectively.

3. The filtration apparatus of claim 2 further characterized in that said wall is a sleeve disposed within said housing and which has a chamber to receive said filter canister, said fittings extending through an extension on said sleeve, and which extension serves as part of said alignment means.

4. The filtration apparatus of claim 3 further characterized in that said process fluid is a process liquid and said filter canister forms part of a pressure vessel which comprises:
   (a) a continuous canister side wall and a canister end wall extending across a portion of said canister side wall enclosing a portion of said canister side wall with said canister end wall,
   (b) manifold means extending across a portion of said canister side wall and being spaced from said end wall to form an enclosed process liquid receiving chamber therein,
   (c) said manifold means having a plurality of spaced apart process liquid receiving passages therein and a manifold chamber communicating with each of said passages, and
   (d) a plurality of filter elements located in said process liquid receiving chamber and each being connected to an individual one of said liquid receiving passages and thereby forming a plurality of process liquid filter paths connecting said process liquid receiving chamber and said manifold chamber.

5. The filtration apparatus of claim 4 further characterized in that
   (a) said process fluid inlet comprises first duct means in said manifold means which connects to said process liquid inlet or outlet fitting and which first duct means communicates with said manifold chamber, and (b) said process fluid outlet comprises second duct means associated with said end wall to connect to the other of said process liquid inlet or outlet fittings and which second duct means communicates with said process liquid receiving chamber.

6. The filtration apparatus of claim 5 further characterized in that said first duct means is connected to said process liquid outlet fitting and said second duct means is connected to said process liquid inlet fitting and the process liquid flows from said receiving chamber, through said filter elements and into said manifold chamber.

7. The filtration apparatus of claim 4 further characterized in that each of said filter devices comprise a perforated shield having a filter element associated therewith.

8. The filter apparatus of claim 4 further characterized in that each of said filter devices comprises an inner perforated shield, a filter element disposed around each said shield, and means forming a central bore within each said shield so that process liquid may flow through said filter element and into said central bore of said shield.

9. The filter apparatus of claim 4 further characterized in that each of said filter devices have a cap thereon with a hollow protrusion of said cap extending into said liquid receiving passage.

10. The filter apparatus of claim 9 further characterized in that a plate is secured to the ends of each of said filter devices in spaced relation to said end wall forming a process liquid inlet or outlet chamber.

11. A housing assembly for use with filter assemblies of the type which are used for filtering contaminants from a temperature controlled process fluid, said housing assembly comprising:
(a) an outer housing having a housing continuous side wall of standard tubular preformed size and shape, said outer housing being comprised of a pair of semi-cylindrical abutted pipe shapes of standard size and shape and forming a central bore in said housing,
(b) a housing end wall extending across said side wall in proximity to one end of said housing side wall,
(c) an inner filter receiving sleeve within said bore of said housing and having a continuous side wall of standard tubular preformed size and shape, said sleeve being comprised of a pair of semi-cylindrical partially abutted pipe shapes of standard size and shape and forming a central bore in said sleeve to provide a filter casing receiving chamber,
(d) a sleeve end wall extending across said sleeve side wall in proximity to one end of said sleeve side wall,
(e) said sleeve side wall having a peripheral size less than the central bore in said outer housing and being spaced from the interior surface of said housing side wall and said sleeve end wall being spaced from said housing end wall to form a temperature controlling fluid chamber around said sleeve side wall and said sleeve end wall,
(f) a pair of diametrally opposed bars extending axially between said sleeve and said housing and securing said side walls of said sleeve and said housing, one of said bars having a groove therein to receive inlet and outlet fittings on a filter assembly to be received in said filter casing receiving chamber,
(g) closure means at the other end of said housing side wall and sleeve side wall to extend between said sleeve and housing side walls and thereby enclose said temperature controlling fluid chamber,
(h) a process fluid inlet arrangement comprising a process fluid inlet pipe connected to said housing and having inlet means which connect said process fluid inlet pipe to said central chamber for introducing the process fluid thereinto, and
(i) a process fluid outlet arrangement comprising a process fluid outlet pipe connected to said housing and having outlet means which connect said outlet pipe to said central chamber for removing the filtered process fluid therefrom.

12. The housing assembly of claim 11 further characterized in that said outer housing side wall and said sleeve side wall are both cylindrical in shape.

13. The housing assembly of claim 11 further characterized in that a filter assembly is removably located in said filter chamber, said filter assembly having a filter casing comprised of:
(a) a casing side wall and having a bore forming a central chamber therein,
(b) first end means extending across said casing side wall in proximity to one end of said casing side wall,
(c) second end means extending across said casing side wall in proximity to the other end of said casing side wall to enclose the central chamber in said casing, and
(d) filter means located in the central chamber of said casing for filtering contaminants from said process fluid.

14. The filter assembly of claim 13 further characterized in that said casing is of a standard preformed tubular size and shape.

15. The housing assembly of claim 14 further characterized in that said casing has said process fluid inlet fitting and said process fluid outlet fitting thereon, and said inlet and outlet fittings are respectively alignable and engagable with said inlet and outlet means when said casing is located in said filter casing receiving chamber.

16. The housing assembly of claim 15 further characterized in that said process fluid inlet and outlet means are passageways and said fittings extend through said elongate groove and have faces which sealingly engage said inlet and outlet pipes, respectively.

17. The housing assembly of claim 14 further characterized in that said second end means is spaced from said sleeve end wall when said casing is retained in said sleeve to form a process fluid chamber around said second end means.

18. The housing assembly of claim 13 further characterized in that bolt means extends through said housing and operatively engage said casing to retain said casing in said central bore of said sleeve.

19. A filtration device for filtering contaminants from a temperature controlled process fluid, said device comprising:
(a) an outer housing having a housing continuous side wall and having a central bore therein,
(b) a housing end wall extending across said side wall in proximity to one end of said housing side wall, (c) an inner enclosing filter receiving sleeve within said bore of said housing and having a central bore therein, (d) a sleeve end wall extending across said sleeve side wall in proximity to one end of said sleeve side wall, (e) said sleeve side wall having a peripheral size less than the central bore in said outer housing and being spaced from the interior surface of said housing side wall to form an annular temperature controlling fluid chamber around said sleeve side wall, (f) a filter device comprising a filter casing removably disposed within the bore of the filter receiving sleeve and said filter casing having a process fluid receiving chamber, (g) said casing having a first projection thereon and said housing having a first column with first elongate groove means therein to receive said first projection when said filter casing is disposed within said sleeve, (h) physical engagement means extending through the side wall of said housing and into the first elongate groove means to engage said first projection and support said filter casing within said sleeve, (i) said housing having a second column with second elongate groove means therein, (j) a process fluid inlet arrangement including a process fluid inlet pipe connected to said housing, said filter device having a process fluid inlet duct associated therewith and communicating with said process fluid receiving chamber for introducing process fluid thereinto, (k) a process fluid outlet arrangement including a process fluid outlet pipe connected to said housing, said filter device having a process fluid outlet duct associated therewith and communicating with said process fluid receiving chamber for removing a filtered process fluid therefrom, and (l) a process fluid inlet fitting on said casing and communicating with said process fluid inlet duct and a process fluid outlet fitting on said casing and communicating with the process fluid outlet duct, said process fluid inlet fitting extending into said second groove means and being alignable with and communicatable with said process fluid inlet pipe and said process fluid outlet fitting extending into said second groove means and being alignable with and communicatable with said process fluid outlet pipe when said casing is disposed within said bore of said sleeves, said engagement means being disengageable from said first projection to enable removal of said filter casing without physical disconnection between said process fluid inlet and outlet pipes.

20. The filtration device of claim 19 further characterized in that said engagement means is a bolt means.

21. The filtration device of claim 20 further characterized in that said bolt means extending through said housing comprises a plurality of spaced apart bolts and each of which engage a spaced apart first projection associated with said casing to retain said casing in said central bore of said sleeve.

22. The filtration device of claim 21 further characterized in that the housing and sleeve are generally cylindrical in shape and said columns are diametrically opposed to each other.

23. The filtration device of claim 22 further characterized in that said columns extend between said sleeve and housing side wall and radially beyond said sleeve side wall, and said elongate grooves extend radially outwardly from said sleeve to almost said housing side wall.

24. The filtration device of claim 19 further characterized in that said process fluid inlet means comprises a first tubular temperature controlling fluid jacket around said first inlet pipe and extending to said housing for receiving a temperature controlling fluid therein, and said process fluid outlet means comprises a second tubular temperature controlling fluid jacket around said second inlet pipe and extending to said housing for receiving a temperature controlling fluid therein.

25. A filtration device for filtering contaminants from a temperature controlled process fluid, said device comprising:

(a) an outer tubular housing having an enclosing side wall and an end wall extending across said side wall, (b) a tubular sleeve located within said outer housing, said sleeve having a side wall with a peripheral size less than and being spaced from the side wall of said housing, (c) means forming an end wall on said sleeve with a peripheral size less than and being spaced from the end wall of said fluid chamber around the side wall and the end wall of said sleeve, (d) a filter means having a filter casing removably disposed within said sleeve and having a chamber to receive and filter a temperature controlled process fluid and said casing having a projection thereon, (e) a temperature controlling fluid inlet line connected to said housing to introduce a temperature controlling fluid into said chamber, (f) a temperature controlling fluid outlet line connected to said housing to remove the temperature controlling fluid from said chamber and thereby maintain a circulating flow of temperature controlling fluid in said chamber, (g) an elongate bar extending along said housing side wall and said sleeve side wall, and having a first groove means therein to receive said projection on said filter casing, (h) first bolt means extending through said housing side wall and engaging said first projection on said casing to secure said casing within said sleeve, (i) a first fitting on said casing and communicating with the chamber in said casing for introducing process fluid thereinto, (j) a second fitting on said casing and communicating with the chamber in said casing for removing process fluid therefrom, (k) a second elongate bar extending along said housing side wall and said sleeve side wall and having a second groove means therein to receive said fittings on said filter casing, (l) a process fluid inlet line extending to and having means through said housing side wall and being alignable and communicatable with said first fitting when said filter casing is located within said sleeve, (m) a process fluid outlet line extending to and having means extending through said housing side wall and being alignable and communicatable with said second fitting when said filter casing is located within said sleeve, (n) a temperature controlling fluid jacket surrounding said process fluid inlet line and extending up to said housing side wall and receiving a temperature controlling fluid for circulation around said process fluid inlet line, and (o) a temperature controlling fluid jacket surrounding said process fluid outlet line and extending up to said housing side wall and receiving a temperature controlling fluid for circulation around said process fluid outlet line.

26. The filtration device of claim 25 further characterized in that said temperature controlling fluid chamber has a longitudinal dimension greater than the longitudinal dimension of the filter casing received therein such that the substantial portion of the longitudinal dimension of the side wall of the filter casing is fully surrounded by a temperature controlling fluid in said temperature controlling fluid chamber.

27. A housing assembly for use with filter assemblies of the type which are used for filtering contaminants from a temperature controlled process fluid, said housing assembly comprising:

(a) an outer housing having a housing continuous side wall of standard tubular preformed size and shape, said outer housing being comprised of a pair of semi-cylindrical abutted pipe shapes of standard size and shape and forming a central bore in said housing, (b) a housing end wall extending across said side wall in proximity to one end of said housing side wall, (c) an inner filter receiving sleeve within said bore of said housing and having a continuous side wall forming a central bore in said sleeve to provide a filter casing receiving chamber, (d) a sleeve end wall extending across said sleeve side wall in proximity to one end of said sleeve side wall, (e) said sleeve side wall having a peripheral size less than the central bore in said outer housing and being spaced from the interior surface of said housing side wall and said sleeve end wall being spaced from said housing end wall to form a temperature controlling fluid chamber around said sleeve side wall and said sleeve end wall, (f) a pair of diametrally opposed bars extending axially between said sleeve and said housing and securing said side walls of said sleeve and said housing, one of said bars having a groove therein to receive inlet and outlet fittings on a filter assembly to be received in said filter casing receiving chamber, (g) closure means at the other end of said housing side wall and shell side wall to extend between said shell and housing side walls and thereby enclose said temperature controlling fluid chamber, (h) a process fluid inlet arrangement comprising a process fluid inlet pipe connected to said housing and having inlet means which connect said process fluid inlet pipe to said central chamber for introducing the process fluid thereinto, and (i) a process fluid outlet arrangement comprising a process fluid outlet pipe connected to said housing and having outlet means which connect said outlet pipe to said central chamber for removing the filtered process fluid therefrom.

* * * * *